United States Patent [19]

Young

[11] Patent Number: 4,848,953

[45] Date of Patent: Jul. 18, 1989

[54] CLAMP ASSEMBLY

[76] Inventor: Niels Young, 1750 Washam Rd., Eagle, Id. 83616

[21] Appl. No.: 185,048

[22] Filed: Apr. 22, 1988

[51] Int. Cl.⁴ .................................................. B25G 3/24
[52] U.S. Cl. ..................................... 403/290; 403/374; 403/371
[58] Field of Search ................. 403/374, 370, 371, 290

[56] References Cited

U.S. PATENT DOCUMENTS

| | | |
|---|---|---|
| 180,117 | 7/1876 | Cubberley . |
| 453,622 | 6/1891 | Cheney . |
| 630,428 | 8/1899 | Wahlert . |
| 662,848 | 11/1900 | Wood . |
| 753,241 | 3/1904 | Davidson . |
| 761,501 | 5/1904 | Kimball et al. . |
| 789,499 | 5/1905 | Lightholder . |
| 806,235 | 12/1905 | Bowen . |
| 812,199 | 2/1906 | Schmitt . |
| 900,717 | 10/1908 | Feaster . |
| 982,947 | 1/1911 | Greer . |
| 1,288,812 | 12/1918 | Bishop . |
| 1,784,259 | 5/1930 | Wallenberg . |
| 1,821,931 | 3/1931 | Cox . |
| 2,330,456 | 3/1943 | Topinka . |
| 2,397,561 | 4/1946 | Petsche . |
| 2,563,464 | 8/1951 | Green . |
| 2,647,484 | 8/1953 | Mathison . |
| 3,019,504 | 2/1962 | Castagliuolo . |
| 3,380,097 | 4/1968 | Pharris . |
| 3,612,474 | 10/1971 | Strohl, Jr. . |
| 3,663,927 | 5/1972 | Bruner . |
| 3,820,801 | 6/1974 | Lindler . |
| 3,861,815 | 1/1975 | Landeaeus . |
| 3,919,524 | 11/1975 | Fortune . |
| 4,095,914 | 6/1978 | Thomsen . |
| 4,121,862 | 10/1978 | Greer . |
| 4,460,289 | 7/1984 | Lundgren ...................... 403/374 X |
| 4,530,523 | 3/1985 | Proni . |
| 4,576,402 | 3/1986 | Murray et al. . |
| 4,588,163 | 5/1986 | Christensen . |
| 4,645,473 | 2/1987 | Mochizuki . |

Primary Examiner—Andrew V. Kundrat
Attorney, Agent, or Firm—Bacon & Thomas

[57] ABSTRACT

A clamp for a cylindrical workpiece, such as a shaft, pipe, cable or the like. The clamp includes a threaded sleeve for circumferentially engaging the workpiece and at least one correspondingly threaded nut in threaded engagement on the sleeve for engaging either another nut on the sleeve or a stationary workpiece integrally formed with the sleeve. The sleeve is provided with a shallow thread configuration having a flank angle which produces a radial force component that exceeds the axial force component when the nut is tightened, thereby imparting a uniform radial clamping force along the entire extent of the threaded engagement.

10 Claims, 2 Drawing Sheets

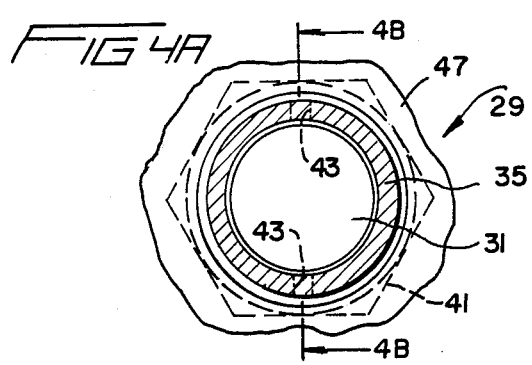
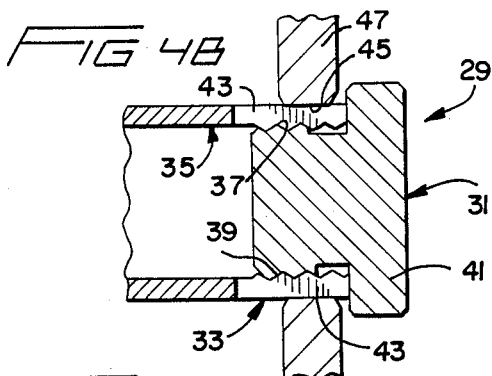
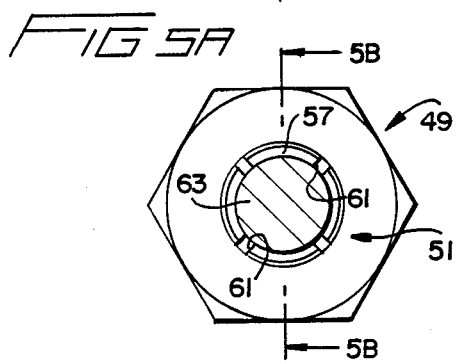
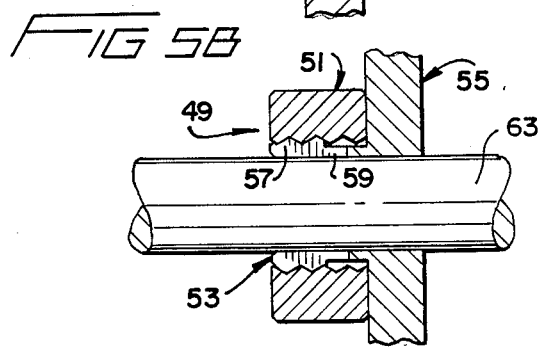
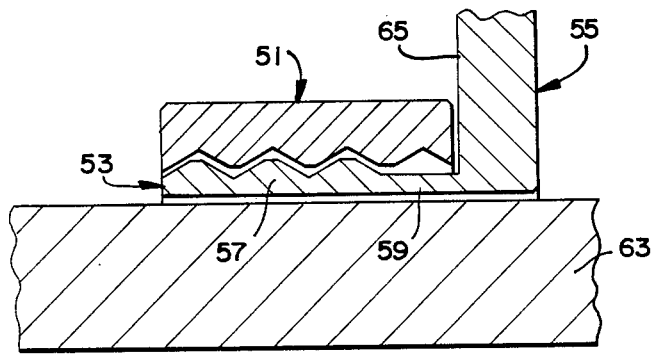
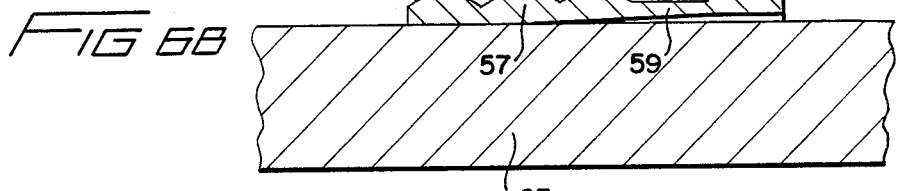
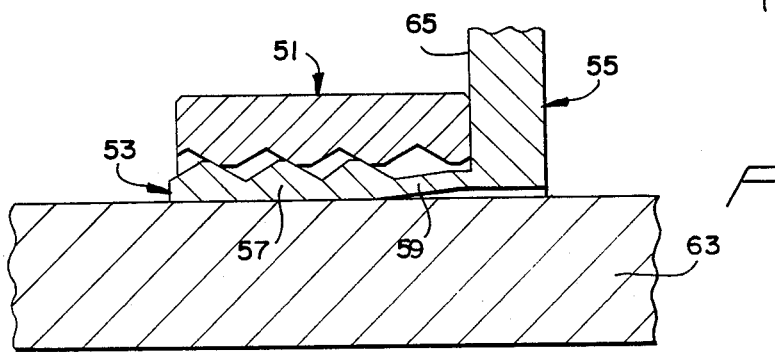

CLAMP ASSEMBLY

BACKGROUND OF THE INVENTION

1. Field of the Invention

The invention generally involves the field of technology pertaining to devices for applying clamping forces to a workpiece. More particularly, the invention relates to an improved assembly for applying radially directed clamping forces to a cylindrical workpiece, such as a shaft, pipe, cable or the like.

2. Description of the Prior Art

Clamps for applying radially directed compressive forces around a cylindrical workpiece are well-known. Such clamps may be used for connecting two cylindrical workpieces to each other or detachably securing a mechanical element to the workpiece.

Known designs of these clamps include the use of tapered threads, various forms of ring clamps, eccentric rings, collets and collars with set screws. Clamps utilizing a tapered thread design are expensive to manufacture and produce high friction forces which oppose a tight clamping action. Moreover, they require precise assembly of the components making up the clamp assembly in order to function properly, and close tolerances if the axial length of the clamp is to be minimized. Ring clamps do not exert uniform clamping pressure and have a relatively large outside diameter and moment of inertia. Eccentric ring designs are characterized by limited and uneven clamping pressure. A collet generally consists of a threaded member for producing an axially directed force and a sliding conical member which resolves a portion of the axial force into radially directed components. Collets are complex in configuration, and the presence of the conical member requires the threaded member to have a thick wall. The clamping pressure imparted by a collet is difficult to render uniform, and a collet would have a greater moment of inertia. Collars with set screws produce uneven clamping pressure and cause physical deformation of the workpiece being clamped.

SUMMARY OF THE INVENTION

It is an object of the present invention to provide an improved clamp assembly for a cylindrical workpiece, such as a shaft, pipe, cable or the like.

It is another object of the invention to provide an improved clamp assembly capable of imparting uniform radially directed clamping forces along the length of a cylindrical workpiece.

It is a further object of the invention to provide an improved clamp assembly for joining two cylindrical workpieces or detachably securing a mechanical element to a cylindrical workpiece.

It is yet another object of the invention to provide an improved clamp assembly for a cylindrical workpiece which is simple in construction, easy to apply and economical to manufacture.

These and other objects of the invention are realized by providing a clamp assembly wherein a first embodiment is defined by a thin-walled threaded sleeve having a shallow thread configuration defined by a flank angle in the range of about forty to eighty-eight degrees. A pair of correspondingly threaded nuts are carried on the sleeve and tightened in opposition against each other to produce a radially directed force component which exceeds the axially directed force component. This causes the sleeve to undergo a uniform reduction in diameter and tightly clamp against a cylindrical workpiece received therethrough. In a second embodiment of the invention, the sleeve is internally threaded for receiving a correspondingly threaded bolt which tightens against an end of the sleeve to uniformly expand the sleeve outwardly for clamping against the internal periphery of an aperture formed in a planar workpiece. In a third embodiment, the threaded sleeve is integrally formed with a planar workpiece and carries a single nut which is tightened against the workpiece to clamp a cylindrical workpiece to the planar workpiece.

Other objects, features and advantages of the invention shall become apparent from the following detailed description of preferred embodiments thereof, when taken in conjunction with the drawings wherein like reference characters refer to corresponding parts in the several views.

BRIEF DESCRIPTION OF THE DRAWINGS

FIG. 4A is a front elevational view of a clamp assembly according to a second embodiment of the invention;

FIG. 4B is a sectional view along the line 4B—4B of FIG. 4A;

FIG. 5A is a front elevational view of a clamp assembly according to a third embodiment of the invention;

FIG. 5B is a sectional view taken along the line 5B—5B of FIG. 5A; and

FIGS. 6A, 6B and 6C are enlarged sectional views depicting the sequential steps of applying the clamp assembly shown in FIGS. 5A and 5B.

DETAILED DESCRIPTION OF THE PREFERRED EMBODIMENTS

Figure 1A:
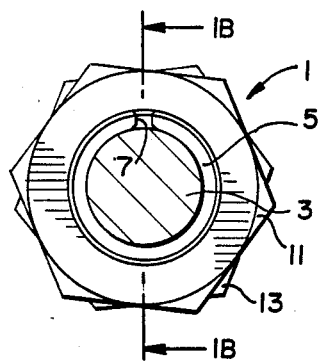
FIG. 1A is a front elevational view of a clamp assembly according to a first embodiment of the invention.
Figure 1B:
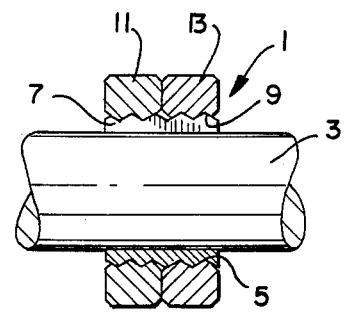
FIG. 1B is a cross-sectional view taken along the line 1B—1B of FIG. 1A.

A clamp assembly 1 according to a first embodiment of the invention shall now be described with reference to FIGS. 1A and 1B. Assembly 1 is shown clamping a cylindrical workpiece 3 which may be in the form of a solid shaft, hollow pipe or tube, cable or the like. Moreover, workpiece 3 may define the joint between two pipes or tubes, or a single pipe or tube and a solid shaft. Assembly 1 comprises a thin-walled threaded sleeve 5 which is provided with an open ended longitudinal slot 7 that extends for the entire length of sleeve 5. The presence of slot 7 permits a greater radial contraction of sleeve 5, although it is understood, depending upon the material from which sleeve 5 is formed and the degree of clamping pressure desired, sleeve 5 may also be utilized in a continuous form without slot 7.

The internal diameter of sleeve 5 is appropriately sized to just permit freely receiving workpiece 3 therethrough. The exterior periphery of sleeve 5 is provided with a shallow threading 9 along the entire length thereof. A pair of identical correspondingly threaded nuts 11 and 13 are threadedly received on sleeve 5. As is apparent in FIG. 1B, rotation of nuts 11 and 13 in opposition towards each other in an axial direction on sleeve 5 causes their eventual engagement. When this occurs, further rotation of nuts 11 and 13 against each other imparts radially directed forces to sleeve 5, thereby causing a reduction in its diameter and subsequent application of a compressive clamping force around workpiece 3. Because sleeve 5 is of uniform diameter throughout its length, a uniform clamping force is applied along the length of workpiece 3 to the longitudinal extent of the threaded engagement between sleeve 5 and nuts 11 and 13. As depicted in FIG. 1B, it is preferred that the cumulative width of nuts 11 and 13 be substantially equal to the overall length of sleeve 5.

Figure 2:
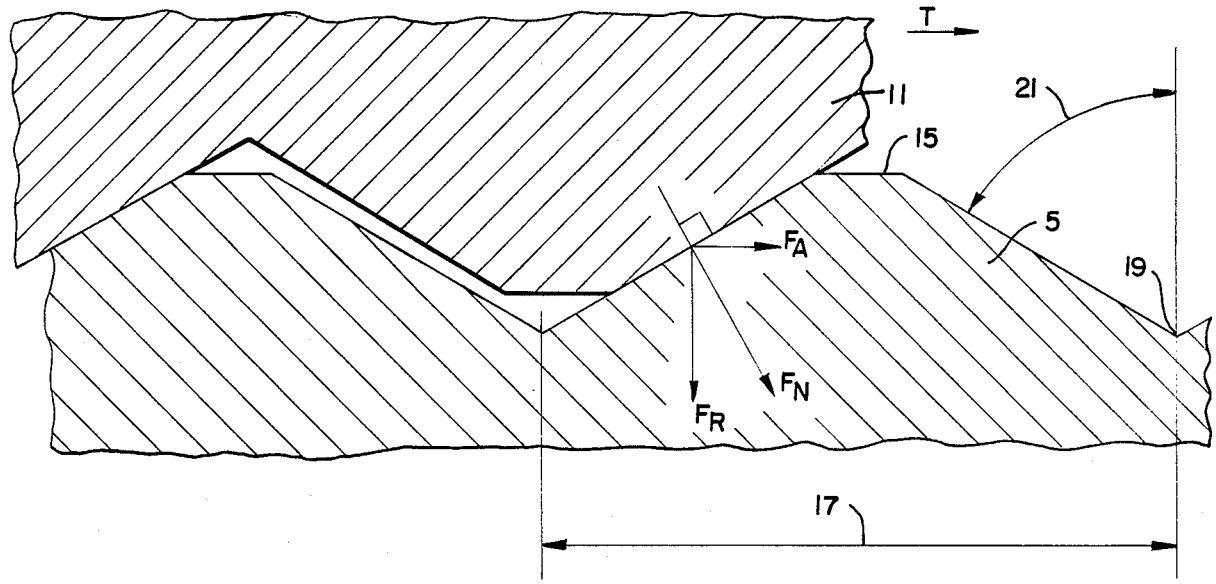
FIG. 2 is an enlarged sectional view showing the details of a threaded sleeve in engagement with a correspondingly threaded nut of the clamp assembly shown in FIGS. 1A and 1B.

The manner in which the axially directed forces created when nuts 11 and 13 of clamp assembly 1 are tightened against each other to produce resultant radially directed forces shall be described with reference to FIG. 2. As shown therein, sleeve 5 and nut 11 are each provided with a corresponding shallow thread configuration that is essentially defined by a crest 15, a pitch 17, a root 19, and a flank angle 21. This same configuration applies for nut 13 (not shown). When nut 11 is tightened against corresponding nut 13 in the direction indicated by arrow T, engagement of the corresponding thread surfaces of nut 11 and sleeve 5 produces an axially directed force component $F_A$, a radially directed force component $F_R$, both of which forces produce a resultant force component $F_N$, the latter being in a normal or perpendicular direction.

In order to realize optimum clamping force by assembly 1, and all embodiments of the invention, it is critical that the radially directed force component $F_R$ exceed the axially directed force component $F_A$ such that the ratio of $F_R$ over $F_A$ is greater than 1. This advantageously creates uniform radially directed force components along the extent of the threaded engagement between sleeve 5 and nuts 11 and 13, thereby resulting in a uniform clamping of workpiece 3. In order to realize this objective, flank angle 21 should be approximately forty to eighty-eight degrees, and preferably fifty-five to eighty-five degrees. This provides a radially directed force component which is greater than the axially directed force component, the opposite result of a conventional threaded assembly wherein the axially directed force component $F_A$ is greater than the radially directed force $F_R$.

Figure 3A:
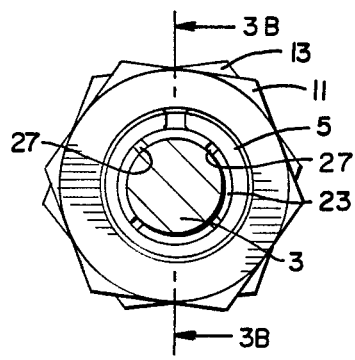
FIG. 3A is a front elevational view of the clamp assembly of FIGS. 1A and 1B shown clamping a hub to a drive shaft.
Figure 3B:
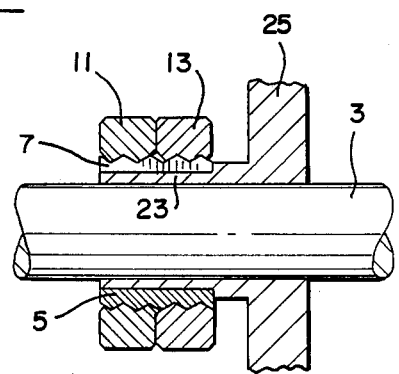
FIG. 3B is a cross-sectional view taken along the line 3B—3B of FIG. 3A.

Referring to FIGS. 3A and 3B, clamp assembly 1 is shown therein in the function of a hub clamp for clamping a hub 23 of a pulley, shown generally at 25, to workpiece 3 which, in this case, may be the drive shaft of a motor. As more clearly shown in FIG. 3A, hub 23 may be provided with a plurality of circumferentially spaced longitudinal slots 27 which serve to divide hub 23 into a plurality of arcuate sections that clamp inwardly against shaft 3 when assembly 1 is applied thereto in the manner previously described. As also shown in FIG. 3B, the portion of hub 23 engaged by assembly 1 is preferably of a reduced diameter and of a length substantially equal to that of sleeve 5. Through the use of assembly 1 in this manner, pulley 25 may be quickly attached to or removed from shaft 3.

A second embodiment of the invention shall now be described with particular reference to FIGS. 4A and 4B. As shown therein, a clamp assembly 29 is defined by a threaded bolt 31 and an internally threaded sleeve 33 formed adjacent the end of a pipe 35. As seen in FIG. 4B, bolt 31 includes an externally threaded portion 37 having a thread configuration corresponding to an internal threaded portion 39 of sleeve 33. Bolt 31 is also provided with a peripheral flange 41 configured for engagement by a wrench or other appropriate tool. Sleeve 33 is provided with a pair of opposed open ended longitudinal slots 43 which permit a greater radial expansion of sleeve 33 upon the threaded engagement of bolt 31 thereto. Assembly 29 is shown disposed through a correspondingly configured aperture 45 of a planar shaped structure 47. When bolt 31 is threadedly engaged within sleeve 33 to the point where flange 41 engages the end of pipe 35, subsequent tightening of bolt 31 causes sleeve 33 to uniformly and radially expand outwardly so that its external periphery is disposed in clamping engagement against the inner periphery of aperture 45, thereby securing pipe 35 to structure 47. Assembly 29, therefore, may function in the basic manner of an expanding mandrel for attaching the end of a pipe to a plate or similar structure.

A fourth embodiment of the invention shall now be described with reference to FIGS. 5A and 5B. In this embodiment, a clamp assembly 49 is shown defined by a threaded nut 51 and a sleeve 53 extending perpendicularly from a planar workpiece 55, such as a pulley, sheave or structurally similar device. Sleeve 53 is preferably integrally formed with workpiece 55 and includes a correspondingly threaded portion 57 and a cylindrical shell 59. Sleeve 53 is also provided with a plurality of open longitudinal slots 61 circumferentially spaced therearound for controlling the degree of radial contraction. The axial width of nut 51 corresponds substantially to the overall length of sleeve 53. The internal diameter of sleeve 53 is slightly larger than that of a cylindrical shaft 63 received therethrough. As is therefore apparent, application of assembly 49 serves to attach shaft 53 to workpiece 55. This is accomplished in a manner which shall now be described with reference to FIGS. 6A, 6B and 6C.

As shown in FIG. 6A, nut 51 is threadedly engaged onto threaded portion 57 until nut 51 is disposed in abutting engagement against a perpendicular surface 65 of workpiece 55. Continued tightening of nut 51 against surface 65, which initiates a radial contraction of threaded portion 57 from its outer end progressively toward cylindrical shell 59. Although clamping of shaft 63 by threaded portion 57 is partially accomplished at this stage, there remains a section of portion 57 which is substantially out of engagement with the peripheral surface of shaft 63, as particularly shown in FIG. 6B. Continued tightening of nut 51 against surface 65 results in a shear deformation of cylindrical shell 59, thereby resulting in further radial contraction along the length of threaded portion 57. This produces a uniform radial clamping of portion 57 against shaft 63 along the entire extent of the threaded engagement between nut 51 and portion 57, as depicted in FIG. 6C. Such uniform clamping of portion 57 results directly from a shear stress that occurs when shell 59 undergoes shear deformation, with such shear stress being sufficiently low to avoid plastic flow or fracture of shell 59. This is realized by forming shell 59 with a specified axial length to radial thickness ratio, hereinafter designated the aspect ratio. Tests have demonstrated that the aspect ratio for practice of this embodiment of the invention should optimally exceed approximately 2.0 for a sleeve 57 formed of plastic material and exceed 4.0 when sleeve 57 is formed of metal. This aspect ratio is critical for realizing uniform radial clamping of shaft 63 by assembly 49.

The threaded sleeves of all clamp assemblies according to the invention may be either unslotted or provided with one or more open slots in order to control the desired degree of radial contraction or expansion. The sleeves may be formed of plastic, metal or any other appropriate material, the nature of which shall also serve to control the degree of radial contraction or expansion. For example, if the threaded sleeve is provided with at least one longitudinal slot, the sleeve is capable of radially contracting or expanding within a range of approximately two percent of the original diameter of the sleeve. If the sleeve is continuous and without a slot, the useful clamping range is approximately 0.2 percent.

It is to be understood that the forms of the invention herein shown and described are to be taken as preferred embodiments of the same, and that various changes in shape, material, size and arrangement of parts may be resorted to without departing from the spirit of the invention or scope of the subjoined claims.

What is claimed is:

1. An assembly for clamping a cylindrical workpiece comprising:
   (a) an externally threaded sleeve of uniform diameter for receiving a correspondingly sized cylindrical workpiece therethrough;
   (b) a pair of threaded nuts disposable in threaded engagement on the sleeve, each nut having a thread configuration corresponding to the thread configuration of the sleeve; and
   (c) the corresponding thread configuration of the sleeve and the nuts being defined by a flank angle within the range of approximately forty to eighty-eight degrees to produce an inwardly directed radial force component exceeding the axial force component when the two nuts are rotated in opposition against each other on the sleeve to cause a uniform radial contraction of the sleeve against the workpiece along substantially the entire extent of the threaded engagement between the sleeve and the nuts.

2. The assembly of claim 1 wherein the flank angle is within the range of approximately fifty-five to eighty-five degrees.

3. The assembly of claim 1 wherein the sleeve includes an open longitudinal slot extending for the entire length of its side wall.

4. An assembly for clamping the end of a cylindrical pipe to a substantially planar workpiece provided with an aperture therethrough comprising:
   (a) an internally threaded sleeve of uniform diameter formed adjacent an end of the pipe, the sleeve being correspondingly sized for disposition through the aperture of the workpiece;
   (b) a threaded bolt for disposition in threaded engagement within the sleeve, the bolt having a thread configuration corresponding to the thread configuration of the sleeve, and including a peripheral flange engageable against the end of the pipe; and
   (c) the corresponding thread configuration of the sleeve and the bolt being defined by a flank angle that is sufficiently shallow to produce an outwardly directed radial force component exceeding the axial force component when the flange is tightened against the end of the pipe to cause a uniform radial expansion of the sleeve against the inner periphery of the aperture along substantially the entire extent of the threaded engagement between the sleeve and the bolt.

5. The assembly of claim 4 wherein the flank angle is within the range of approximately forty to eighty-eight degrees.

6. The assembly of claim 5 wherein the flank angle is within the range of approximately fifty-five to eighty-eight degrees.

7. The assembly of claim 4 wherein the sleeve includes at least one open longitudinal slot extending for substantially the entire length of its side wall.

8. An assembly for clamping a cylindrical workpiece to a substantially planar workpiece comprising:
   (a) a sleeve extending outwardly of the planar workpiece and defining an axial passageway for receiving the cylindrical workpiece therethrough;
   (b) the sleeve including an outer threaded portion of uniform diameter and an inner cylindrical shell, the cylindrical shell being disposed between the threaded portion and the planar workpiece;
   (c) a threaded nut for disposition in threaded engagement on the threaded portion of the sleeve and having a thread configuration corresponding to the thread configuration of the threaded portion;
   (d) the corresponding thread configuration of the threaded portion of the sleeve and the nut being defined by a flank angle within the range of approximately forty to eighty-eight degrees to produce an inwardly directed radial force component exceeding the axial force component when the nut is threadedly engaged on the threaded portion and rotated against the planar workpiece to cause a uniform radial contraction of the threaded portion against the cylindrical workpiece along substantially the entire extent of the threaded engagement between the threaded portion and nut; and
   (e) the cylindrical shell having an axial length to radial thickness ratio exceeding approximately 2.0 to permit the shell to undergo shear deformation during tightening of the nut against the planar workpiece and cause the uniform radial contraction of the sleeve.

9. The assembly of claim 8 wherein the flank angle is within the range of approximately fifty-five to eighty-five degrees.

10. The assembly of claim 8 wherein the sleeve includes at least one open longitudinal slot extending for the entire length of its side wall.

* * * * *